(12) United States Patent
Loos

(10) Patent No.: US 8,860,815 B2
(45) Date of Patent: Oct. 14, 2014

(54) APPARATUS, METHOD AND COMPUTER PROGRAM FOR IMAGE-BASED TRACKING OF SURVEILLANCE OBJECTS

(75) Inventor: Hartmut Loos, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1460 days.

(21) Appl. No.: 11/948,453

(22) Filed: Nov. 30, 2007

(65) Prior Publication Data

US 2008/0211909 A1 Sep. 4, 2008

(30) Foreign Application Priority Data

Mar. 2, 2007 (DE) .......................... 10 2007 010 186

(51) Int. Cl.
*H04N 5/225* (2006.01)

(52) U.S. Cl.
USPC .......................................................... 348/169

(58) Field of Classification Search
USPC .................................. 348/143, 169; 382/181
See application file for complete search history.

(56) References Cited

U.S. PATENT DOCUMENTS

| 6,298,143 B1 | 10/2001 | Kikuchi et al. | |
|---|---|---|---|
| 2003/0059081 A1 | 3/2003 | Trajkovic | |
| 2003/0169340 A1* | 9/2003 | Kamijo et al. ............... | 348/169 |
| 2004/0249567 A1 | 12/2004 | Stiller | |
| 2007/0013791 A1* | 1/2007 | Kinoshita et al. ............ | 348/239 |
| 2008/0060034 A1* | 3/2008 | Egnal et al. .................. | 725/105 |

FOREIGN PATENT DOCUMENTS

| DE | 101 33 386 | 1/2003 |
|---|---|---|
| GB | 2 423 661 | 8/2006 |

OTHER PUBLICATIONS

Reichenbach, S.E.; Jing Li, "Restoration and reconstruction from overlapping images for multi-image fusion," Geoscience and Remote Sensing, IEEE Transactions on , vol. 39, No. 4, pp. 769,780, Apr. 2001.*
Anwaar-Ul-Haq; Mirza, A.M.; Qamar, S., "An optimized image fusion algorithm for night-time surveillance and navigation," Emerging Technologies, 2005. Proceedings of the IEEE Symposium on , vol., no., pp. 138,143, Sep. 17-18, 2005.*
Ping et al., "Texture-Independent Feature-Point Matching (TIFM) from Motion Coherence", 2007, Springer Berlin Heidelberg, 8th Asian Conference on Computer Vision, Tokyo, Japan, Nov. 18-22, 2007, Proceedings, Part 1, pp. 789-799.*

* cited by examiner

*Primary Examiner* — Taylor Elfervig
(74) *Attorney, Agent, or Firm* — Michael J. Striker

(57) ABSTRACT

In automatic assessment or surveillance with camera-based surveillance systems, it is of particular interest to detect moving surveillance objects, such as persons or motor vehicles, and track them over time so that if there are unusual trajectories or unusual behavior, an alarm can be tripped. An apparatus for image-based tracking of surveillance objects in front of a scene background in a surveillance scene is proposed, having an object segmentation module that is embodied for ascertaining moving object areas in front of the scene background on the basis of a comparison of one or more camera images with a reference image of the scene; having an administration module which is embodied for assigning surveillance objects to the moving object areas detecting fusion of two or more surveillance objects and marking them jointly as an object group; and having a feature detection module which is embodied in terms of programming and/or circuitry for determining local features for tracking the surveillance objects of the object group in the image areas defined by the moving object areas.

12 Claims, 3 Drawing Sheets

APPARATUS, METHOD AND COMPUTER PROGRAM FOR IMAGE-BASED TRACKING OF SURVEILLANCE OBJECTS

CROSS-REFERENCE TO A RELATED APPLICATION

The invention described and claimed hereinbelow is also described in German Patent Application DE 102007010186.6 filed on Mar. 2, 2007. This German Patent Application, whose subject matter is incorporated here by reference, provides the basis for a claim of priority of invention under 35 U.S.C. 119(a)-(d).

BACKGROUND OF THE INVENTION

Surveillance systems for surveillance of public squares, buildings, but also private facilities or factories, often include a plurality of video cameras that are aimed at relevant areas to be observed. The image data acquired by the surveillance cameras are typically put together centrally and evaluated.

The evaluation can be done on the one hand by surveillance personnel, but this job is stressful and fatiguing, so that surveillance mistakes from decreasing attentiveness or a lack of attention cannot be precluded. It is advantageous for this reason to evaluate the image data automatically and to detect events in the surveillance scenes on the basis of predetermined conditions.

In automated evaluation and surveillance, it is of particular interest to detect moving surveillance objects, such as persons or motor vehicles, and track them over time, so that if unusual trajectories occur or unusual behavior occurs, an alarm can be tripped. For this purpose, image processing algorithms are typically used; the moving object areas are separated in the context of an object segmentation from an essentially static scene background and are tracked over time, and if relevant motions occur, an alarm is tripped. For the object segmentation, these conventional methods typically evaluate the differences between a current camera image and a reference image of the scene that models the static or quasi-static scene background.

These image processing algorithms for separating the moving surveillance objects from a scene background usually function reliably, as long as individual surveillance objects can be distinguished from one another. In the case where the number of moving surveillance objects keeps increasing, and these surveillance objects come closer and closer together and finally even overlap, however, segmented image areas of various surveillance objects fuse into an image area of a common object or object group. Although it appears possible to detect this fusion, however, the object segmentation and tracking of surveillance objects during the fusion involves many problems and has not yet been solved to satisfaction.

German Patent Disclosure DE 101 33 386 A1 describes a method and an apparatus for detecting an actual position of a person within a predeterminable area and a use of the method and/or apparatus. The method described in this reference detects a person in a surveillance area. In the next step, a significant feature of the person is determined, and the further evaluation—particularly to save computation time—is limited solely to observation, and in particular detection and tracking, of this at least one significant feature. In contrast to the conventional image processing algorithms described above, this reference thus has to do with tracking individual features in a sequence of images.

However, since this reference discloses nothing about how to proceed in surveillance situations in which a plurality of surveillance objects are present, the closest prior art is most likely conventional image processing algorithms.

SUMMARY OF THE INVENTION

It is therefore an object of the present invention to provide an apparatus, a method and a computer program for image-based tracking of surveillance objects which are further improvements of the existing solutions.

In keeping with these objects, one the features of the invention resides, briefly stated, in an apparatus for image-based tracking of surveillance objects in front of a scene background in a surveillance scene, comprising an object segmentation module configured for ascertaining moving object areas in front of the scene background, an administration module configured for assigning surveillance objects to the moving object areas, detecting a fusion of two or more surveillance objects, and making them jointly as an object group, and a feature detection module configured in terms of programming and/or circuitry for determining local features for tracking the surveillance objects on the object group in image areas defined by the moving object areas.

Another feature of the present invention resides, briefly stated, in a method for image-based tracking of surveillance objects, comprising the steps of detecting a fusion of two or more surveillance objects into one object group at a time t; determining local features of the surveillance objects of the object group in image areas of camera images that show a surveillance scene at a time t−1 chronologically before the fusion; determining the local features, found at a t−1 in a camera image at time t or t+1; assigning the local features, found at time t and/or t+1, to a surveillance object of the object group; tracking and/or identifying the surveillance object in the object group on a basis of the assigned local features at time t and/or t+1.

Still a further feature of the present invention resides, briefly stated, in a computer program with program code means for performing the steps of the inventive method, if the program is performed on a computer program on a computer or on the apparatus of the invention.

According to the invention, an apparatus for image-based tracking of surveillance objects in front of a scene background in a surveillance scene is proposed that is preferably embodied as a processing device, in particular as a computer, DSP, microcontroller, or the like. Optionally, the apparatus is a component of a video surveillance system and is connectable and/or connected to one or more surveillance cameras, and the surveillance cameras can be and/or are located so as to observe a plurality of relevant surveillance scenes, such as public squares, intersections, or buildings.

A surveillance scene of this kind can be subdivided into a static or quasi-static scene background and one or more surveillance objects that are in motion in front of the scene background and will therefore hereinafter be called moving object areas.

The apparatus has an object segmentation module which is embodied for detecting and/or segmenting moving object areas in front of the scene background. This process is preferably done on the basis of a comparison of one or more camera images, in particular current camera images, with a reference image of the scene. The reference image of the scene is formed for instance in modeled fashion by means of long-term observation of the surveillance scene or the like.

An administration module is also provided, which is embodied for assigning surveillance objects to the moving object areas (or vice versa), so that what in particular is a biunique (bijective) assignment specification between object areas and surveillance objects is formed. In addition, the administration module is embodied for detecting fusion of two or more surveillance objects and marking these fused surveillance objects jointly as an object group, or in other words assigning the membership in an object group as a property to the surveillance objects, for instance. Detecting such fusion is done for instance by monitoring the number of surveillance objects, by evaluating the trajectories, and/or by evaluating the surface areas of the moving object areas. The term "fusion" should preferably be understood as an overlap of the surveillance objects and/or a drop below a minimum spacing, which in particular can be predetermined, between the surveillance objects.

In accordance with the invention, the apparatus has a feature detection module, which by programming and/or circuitry is embodied for determining local features for tracking the surveillance objects in the object group in the image areas defined by the moving object areas, especially the surveillance objects and in particular the surveillance objects in an object group.

Local features are preferably defined as features that can be ascertained by evaluating a partial area of the moving object areas and/or image areas. Some possible examples for local features are textures; distributions of brightness; so-called KLT features; so-called SIFT features, as described for instance in the scientific publication by David G. Lowe: Distinctive Image Features from Scale-Invariant Keypoints, in International Journal of Computer Vision, 2004; local features based on the optical flow, and local features based on mean-shift and/or block-matching. In particular, the local features are embodied as robust features.

The local features are determined in the image areas defined by the moving object areas. The image areas may be embodied identically to the moving object areas, or they may be defined only on the basis of the moving object areas and, for instance in contrast to the moving object areas, as rectangular areas, or they may be enlarged about a surveillance edge so that in the peripheral areas of the moving object areas as well the local features can be detected without error. Preferably, the image areas are defined by the moving object areas of the surveillance objects of one object group, so that the local features for an object group are searched in the object areas that correspond to that object group.

The invention is based on the thought that the typical image processing algorithms for object segmentation and tracking are inadequate, especially when fusion of surveillance objects occurs. Tracking surveillance objects on the basis of local features, conversely, is complicated in terms of computation and possibly even vulnerable to error. According to the invention, it is therefore proposed that local features for tracking the surveillance objects in a fused object group be used, but the local features are searched for only and exclusively in image areas that are defined on the basis of the moving object areas that correspond to the object group. With this procedure, computation time is saved, since the local features are searched only within very limited image areas; on the other hand, the security of detection and tracking is enhanced because additional information from the camera images is used for the sake of certainty.

As a result, the apparatus of the invention makes it possible for individual surveillance objects, even in fused areas or when the objects cover one another, can be tracked separately, since the evaluation of local features achieves more-precise knowledge about the movement of the individual moving object areas, and thus the image tracking of surveillance objects that are hiding one another or come quite close to one another is significantly improved.

For selectively assigning local features and/or a group of local features from the object areas or image areas that correspond to the surveillance objects to the surveillance objects and/or the fused surveillance objects at a time t−1 and/or to the surveillance objects of the object group at a time t and/or t+1. Thus the administration module has data sets which include a selection from among the following data, or all of the following data:

surveillance object identity,
time,
object area,
group of local features,
assignment to an object group.

This data set can advantageously be used—as described in further detail below—for tracking surveillance objects.

Advantageously, it is specifically provided that the apparatus has an object tracking module, which is embodied for performing an object detection and/or tracking of the individual surveillance objects of an object group by tracking the local features and/or the group of local features of the individual surveillance objects. This embodiment further emphasizes the concept of the invention of using not only the motion information that is ascertained from the comparison of camera images with a reference image of the scene, but also further information on object detection and tracking.

In a preferred refinement of the invention, local features from camera images before the fusion and/or after the fusion are selectively assigned to the surveillance objects. Thus a first group is formed of local features that were ascertained in the camera images before the fusion, and a second group is formed of local features that originate in camera images that were determined after the fusion of the surveillance objects.

In particular, it is provided that the group of local features from camera images before the fusion and the group of local features from camera images after the fusion form a non-empty cut quality. In other words, local features determined before the fusion are selectively assigned to the surveillance objects and form a selection of local features which are then searched for in the image areas after the fusion. This procedure makes it possible to be limited in the evaluation to the local features found before the fusion, or at least to concentrate on them, and thus to keep the required computation power of the apparatus low.

However, it is possible that the group of local features before the fusion was more powerful or that it has different local features from the group of local features after the fusion. This optional non-empty remaining quantity, to be assigned to the group of local features from camera images before the fusion, is recognized in the evaluation as a set of lost features and is deactivated and/or erased.

On the other hand, it is also possible that new features may be found after the fusion. This non-empty remaining quantity of the groups of local features after the fusion from the group of local features before the fusion is defined as new features and assigned to one of the surveillance objects of the object group. This assignment can be made for instance via a neighborhood correlation, in which a new feature that is located in the vicinity of existing local features of a surveillance object is assigned to that surveillance object. Moreover, the new feature can be assigned to a surveillance object on the basis of a feature trajectory, and the new feature is assigned to the surveillance object whose local features have the same trajectory properties, in particular direction and/or speed. Other possible assignments are made via a statistical evaluation or radius evaluation, in which the closest local feature in a radius around the new local feature is searched for, and the new local feature is assigned to the surveillance object of the closest local feature.

In a refinement of the apparatus, the administration module is embodied for erasing the marking as an object group for the individual surveillance objects upon a separation of an object group. Preferably, once the marking as an object group has been erased, the local features of this object group are not further detected.

A further subject of the invention is a method, which is preferably performed using the apparatus just described above, or as defined by one of the foregoing claims. In the method of the invention, a fusion, in particular touching or extremely close approach, of two or more surveillance objects into an object group is detected at a time t. In addition, local features of the surveillance objects of the object group are searched for in image areas of camera images that show the surveillance scene at a time t−1, or in other words at a time chronologically before the fusion; the image areas are preferably determined on the basis of a comparison of one or more current camera images with a reference image of the scene.

Preferably, the detection of the fusion is done first, and in a second step, the local features in the camera images of an earlier time are determined. Thus detecting the fusion forms a starting signal for determining the local features. In alternative embodiments, it may be provided that local features are determined as described on a continuous basis and after the fusion is detected are further processed by information technology. In the further course, the local features found at time t−1 in one or more camera images are searched for at time t or t+1, or in other words in a current camera image or a camera image chronologically following the fusion. The local features found at time t or t+1 are assigned to a surveillance object in the object group on the basis of membership in the surveillance object at the earlier time t−1. In a further step, an identification and/or tracking of the surveillance objects in the object group is done on the basis of the assigned local features.

The steps described of the method can be performed in the above order, or in some other order.

In a refinement of the invention, local features that have been determined at time t−1 and cannot be found again at times t and/or t+1 are erased or deactivated. In addition, it may be provided that the camera images at time t or t+1 are examined for new features that could not be determined at time t−1; these new local features are then selectively assigned to the surveillance objects in accordance with various rules, already discussed as examples above.

A further subject of the invention is a computer program with program code means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
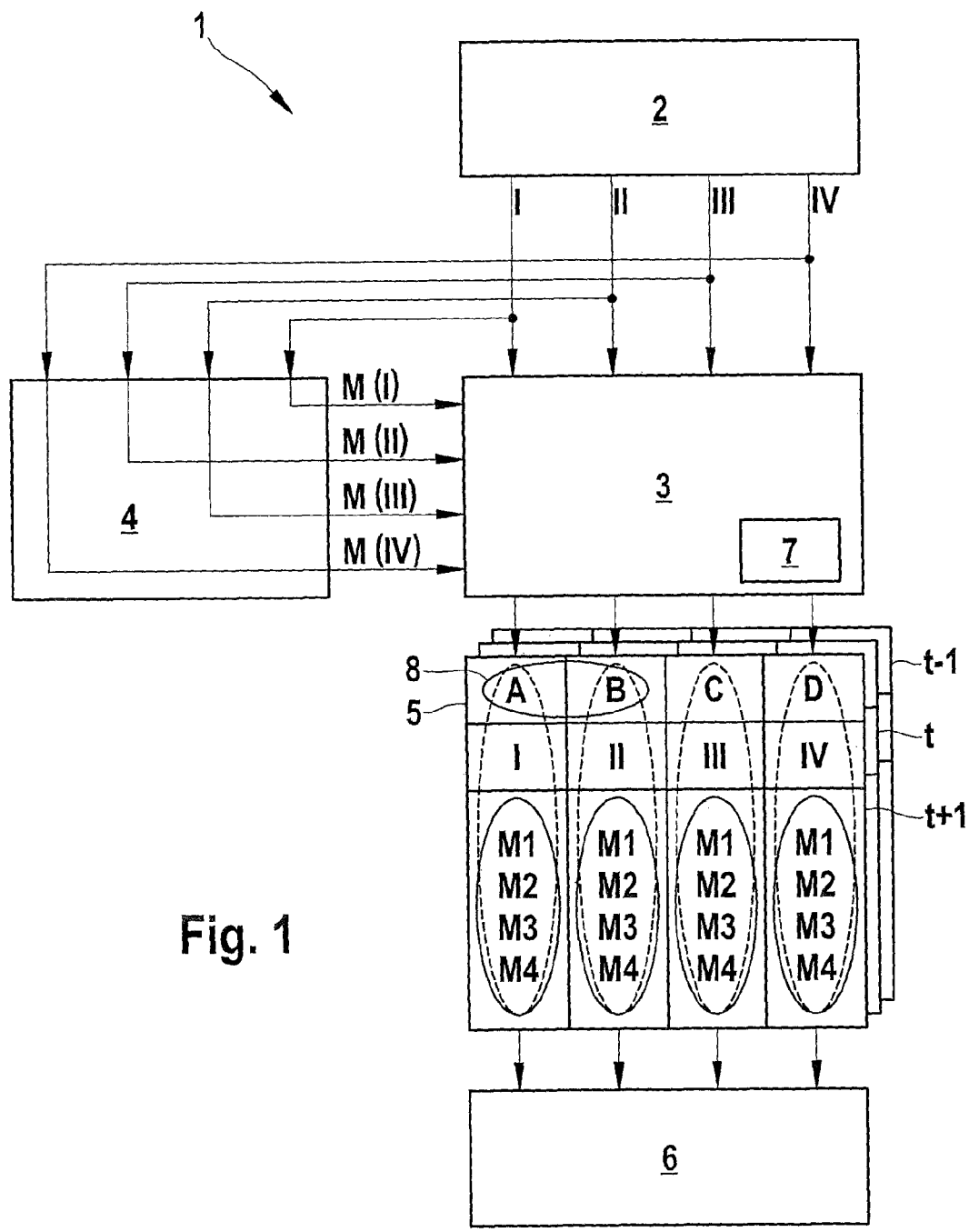
FIG. 1 is a schematic block diagram of an apparatus for image-based tracking of surveillance objects, as one exemplary embodiment of the invention.

FIG. 1 shows a schematic block diagram of an apparatus 1 for image-based tracking of surveillance objects in front of a scene background; the apparatus 1 can be and/or is connected to one or more cameras (not shown). An object segmentation module 2 receives the image data of the camera or cameras and determines moving object areas I, II, III and IV by comparing current camera images with a reference image of the scene. The reference image of the scene is modeled, for instance by long-term observation of the surveillance scene, manual input, or the like. The moving object areas detected are forwarded on the one hand to an administration module 3 and on the other to a feature detection module 4 for further processing.

The administration module 3 assigns a surveillance object A, B, C, D to the moving object areas I, II, III, IV and stores this assignment in memory in a data field 5. For instance, in data field 5, the surveillance object A is assigned to the object area I. The data field 5 is determined for various times t−1, t, t+1, etc. It is understood that the data need not be stored in the organizational structure shown; instead, any possible memory architecture may be employed.

The feature detection module 4 is embodied for detecting local features in the moving object areas 1-4. The local features are embodied for instance as textures, distributions of brightness, or the like. In the event that such local features have been found, they are forwarded object-region-specifically, as a group of features M (I), M (II), M (III), M (IV), to the administration module 3. The administration module 3 then assigns the local features found to the various surveillance objects A, B, C and D as the features M (I), M (II), M (III), M (IV).

A tracking module 6 is embodied for detecting the surveillance objects A, B, C and D in the camera images and tracking them over time, on the basis of the local features corresponding to the surveillance objects A, B, C and D and optionally with the addition of the moving object areas I, II, III and IV corresponding to them.

In the event of a fusion of surveillance objects, the administration module 3 has a detection module 7, which is embodied for detecting the fusion. As a reaction to a detected fusion of surveillance objects, these objects are marked in the data field 5, for instance as an object group 8, with reference to the surveillance objects A and B. Both the selection of the surveillance objects and their marking is understood to be shown only as an example in FIG. 1.

The apparatus 1 in FIG. 1 now makes various modes of operation possible:

In a first mode of operation, for each moving object area I, II, III, IV, or for each surveillance object A, B, C, D, the local features are determined, and the tracking module 6 detects and tracks the respective surveillance object A, B, C, D using the information from the corresponding moving object areas I, II, III, IV and the corresponding local features M (I), M (II), M (III), M (IV). In this mode of operation, however, the computation complexity is high and—at least when the surveillance objects are present in such a form that they are separate from one another—provides only a slight enhancement of the certainty of surveillance.

In a second mode of operation, the local features are determined only for surveillance objects or object areas that can be classified by the detection module 7 as belonging to an object group 8. The other surveillance objects or object areas, in this mode of operation, are not examined for local features. In the evaluation by the tracking module 6, it can be provided on the one hand that the detection and tracking of the surveillance objects A, B marked as belonging to an object group 8 is done solely via the local features, or optionally in addition via the information about the corresponding object areas.

In a practical embodiment that saves computation time and effort, in the detection of the fusion of the surveillance objects A, B into the object group 8 at a time t, the fused surveillance objects A, B are marked. In the next step, local features of the fused surveillance objects A, B are examined at an earlier time, that is, a time t−1. The local features found at a time t−1 for the fused surveillance objects A, B form a selection set for detecting the local features at time t, or in other words at the time of the fusion, and at time t+1, that is, a time after the fusion. The feature detection module 4 accordingly examines camera images at times t and t+1 only for the selection of features that was made at time t−1. Optionally, as a possible correction of the selection set, it is provided that local features that cannot be found again at time t and t+1 are deleted from the selection of features or are temporarily deactivated, and/or that the feature detection module 4 searches for further local features that were not contained in the original selection of features, but which are features that promise particular success or are robust features. If such new features are found, they are selectively assigned to a surveillance object A, B; the assignment is made by way of evaluating the correlation of the new local features with the local features already assigned to the surveillance objects A or B.

After a separation of the fused surveillance objects A, B, the marking of the object group 8 is erased. The corresponding object areas I, II are not further examined for the local features. Instead, a switchover is made from the tracking module 6 to a monitoring mode based on the detected object areas I, II, III, IV; this mode is more favorable in terms of computation time.

Figure 2:
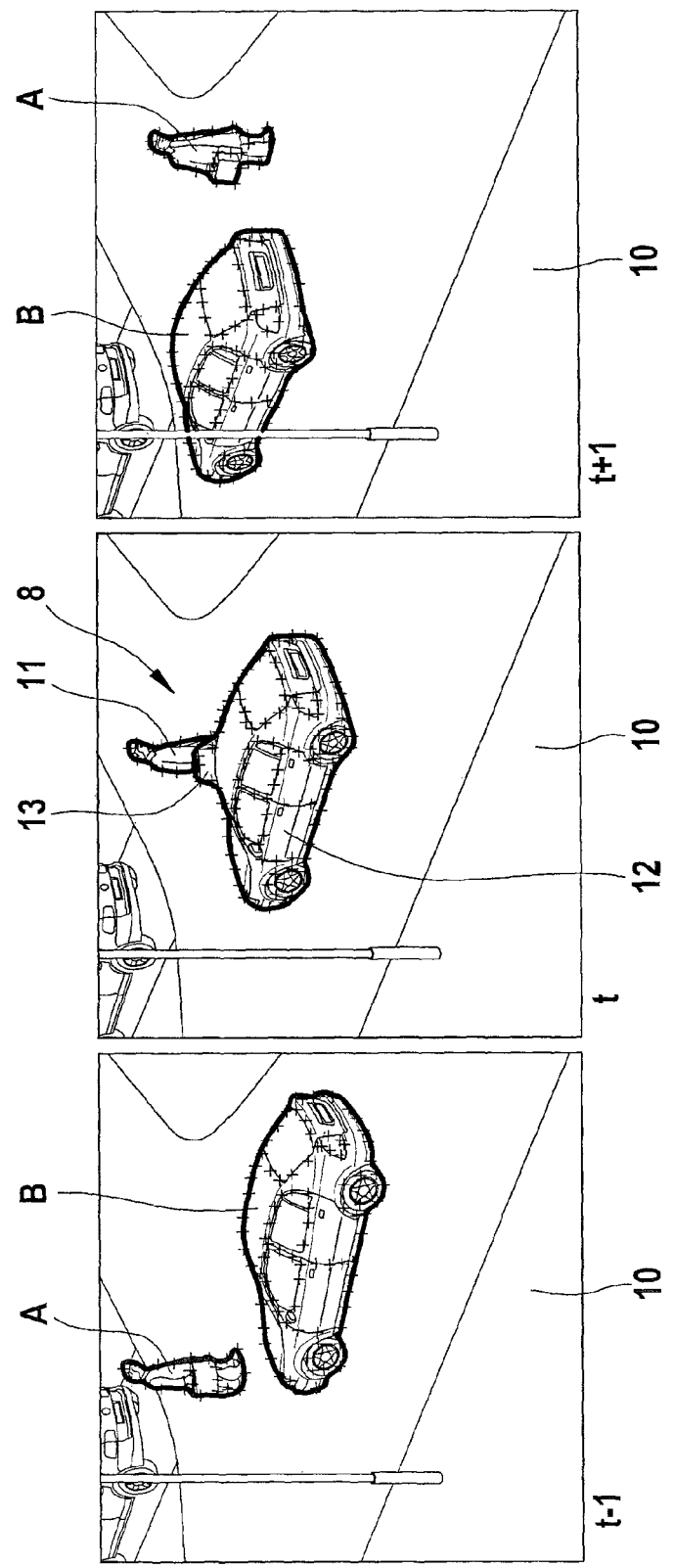
FIG. 2 shows a first sequence of camera images at various times to illustrate the use of the apparatus in FIG. 1.

FIG. 2 shows a surveillance scene 10 at times t−1, t and t+1. In the surveillance scene, a pedestrian A can be seen as a first surveillance object and a motor vehicle B can be seen as a second surveillance object. At time t, pedestrian A and vehicle B are fused with one another and form an object group 8. The detection module 7 (FIG. 1) detects this fusion and marks the fusion in the data field 5 at time t.

In reaction to the detected fusion, a search is made in the camera image at time t−1 for local features of the pedestrian A or vehicle B. Local features found are shown in FIG. 1 as crosses. These local features are assigned to the pedestrian A or vehicle B and form a selection of features for further evaluation. It should be pointed out that the local features are searched only in those image areas that have been detected, by object segmentation, as moving object areas in front of the static or quasi-static scene background, or by comparison of the current camera image with a reference image of the scene. The image areas detected as moving object areas are outlined with a black line in FIG. 2.

At time t, the object areas of pedestrian A and vehicle B are fused; in the common object area of the object group 8, a search is made for the local features in accordance with the selection of features. Since many of the local features of the selection of features can be found, and the features can be assigned on the basis of their membership at time t−1 in a surveillance object A or B, the common object area of the object group 8 breaks apart into three individual areas; a first partial object area 11 can be assigned to the pedestrian A and a second partial object area 12 can be assigned to the motor vehicle B. A third partial object area 13 cannot be assigned with the requisite certainty to either of the two surveillance objects A or B and is not further taken into account in the evaluation of the camera image at time t. As can be seen from the camera image at time t, the position of the surveillance objects A and B can be uniquely ascertained by the tracking module 6 (FIG. 1) by the assignment via the local features.

The camera image at time t+1 shows the surveillance objects A and B after the separation; the marking as an object group 8 is erased, and further tracking of the surveillance objects A, B is done for instance exclusively by way of tracking the moving object areas.

Figure 3:
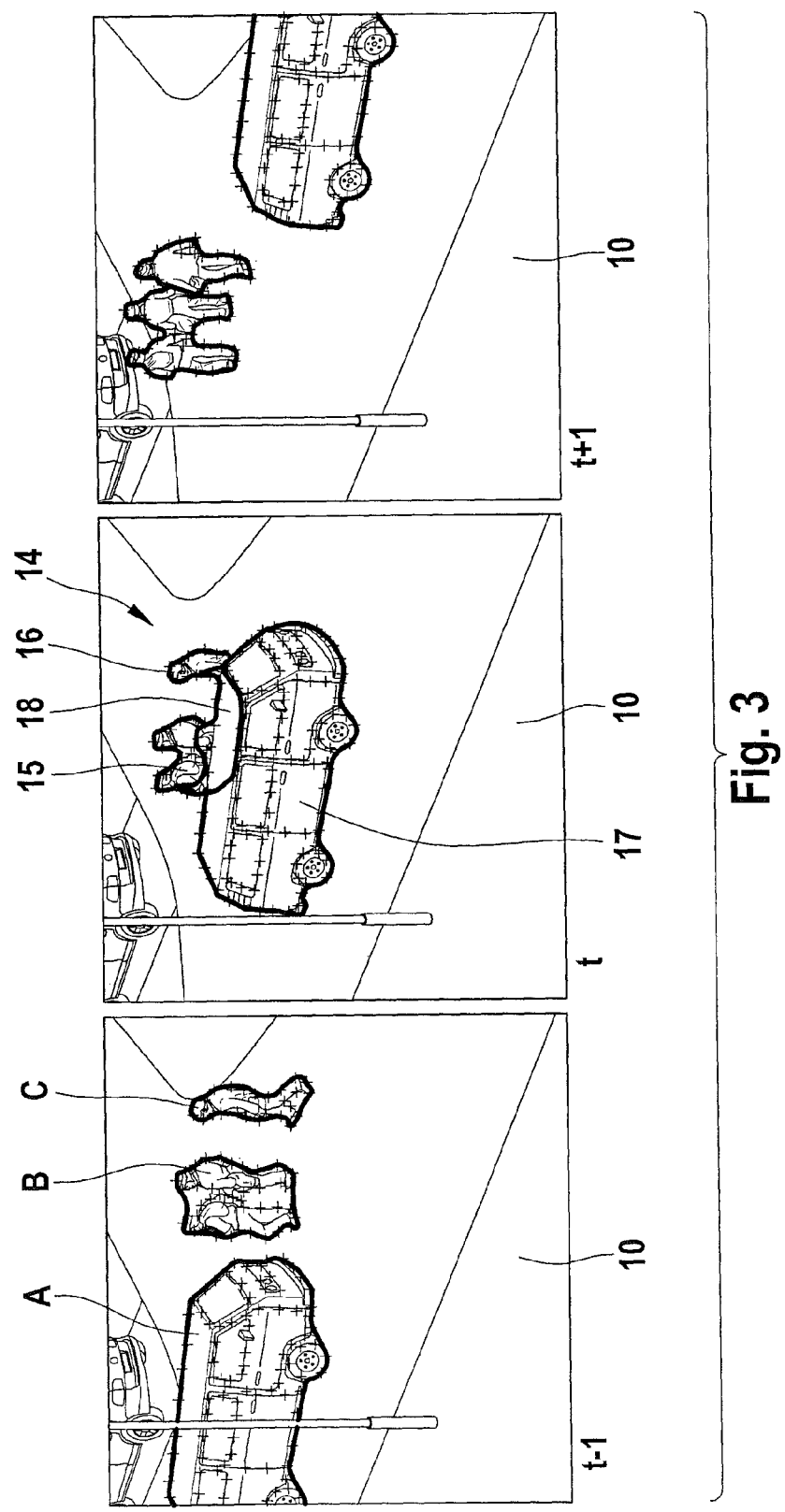
FIG. 3 is a second sequence of camera images at various times to illustrate the use of the apparatus in FIG. 1.

FIG. 3 shows a second exemplary embodiment for illustrating the invention; a first surveillance object is again formed by a motor vehicle A, a second surveillance object by a group of two persons B, and a third surveillance object by a single person C. At time t, these three surveillance objects are fused into one common moving object area in an object group 14; in analogous application of the procedure in FIG. 2, the evaluation of the local features makes it possible to form partial object areas 15, 16 and 17, which can be assigned to the surveillance objects A, B and C, as well as a partial object area 18 that cannot be assigned to any of the surveillance objects A, B, or C. After separation of the surveillance objects A, B, C at time t+1, the surveillance objects A, B and C can again be tracked separately.

It will be understood that each of the elements described above, or two or more together, may also find a useful application in other types of constructions differing from the type described above.

While the invention has been illustrated and described as embodied in an apparatus, method and computer program for image-based tracking of surveillance objects, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus comprising:
   a processor; and
   memory storing modules;
   wherein said processor executes said stored modules and performing image-based tracking of surveillance objects in front of a scene background in a surveillance scene; and
   wherein said stored modules comprise:
   an object segmentation module, stored in said memory, ascertaining moving object areas in front of the scene background;
   an administration module, stored in said memory, assigning surveillance objects to the moving object areas, detecting a fusion of two or more surveillance objects, and making them jointly as an object group; and
   a feature detection module, stored in said memory, determining local features for tracking the surveillance objects of the object group only, in image areas defined by the moving object areas, wherein said local features comprise features ascertained by evaluating a partial area of the moving object areas, the image areas, or both the object areas and image areas prior the fusion of the two or more objects as the object group, and wherein said local features are features selected from the group consisting of textures, distribution of brightness, Kanade-Lucas-Tomasi (KLT) features, and Scale-Invariant-Feature-Transform (SIFT) features, or any combination thereof.

2. An apparatus as defined in claim 1, wherein said administration module is programmed for selecting the assigning local features and/or a group of local features from the moving object areas to the fused surveillance object and/or to the surveillance objects of the object group.

3. An apparatus as defined in claim 1, further comprising an object tracking module programmed for performing object tracking of the surveillance objects of the object group by tracking local features and/or group of local features of the surveillance objects of the object group.

4. An apparatus as defined in claim 1, wherein said administration module is programmed for selectively assigning local features from camera images before the fusion and/or local features from camera images after the fusion to the surveillance objects of the object group.

5. An apparatus as defined in claim 4, wherein said administration module is programmed so that the group of local features from camera images before the fusion and the group of local features from camera images after the fusion form a non-empty cut quality.

6. An apparatus as defined in claim 4, wherein said administration module is programmed so that the group of local features from camera images before the fusion and the group of local features from camera images after the fusion form a non-empty remaining quantity comprising the group of local features from camera images before the fusion and the local features of the remaining quality, as lost features, to be deactivated and/or erased.

7. An apparatus as defined in claim 4, wherein said administration module is programmed so that the group of local features from camera images before the fusion and the group of local features from camera images after the fusion form a non-empty remaining quantity comprising the group of local features from camera images after the fusion, and the local features of the remaining quantity, as new features, are assigned to one of the surveillance objects of the object group.

8. An apparatus as defined in claim 1, wherein said administration module is programmed for erasing markings as an object group upon a separation of an object group.

9. A method for image-based tracking of surveillance objects that is implemented by a processing device having a memory, the method comprising the steps of:
detecting, by the processing device, a fusion of two or more surveillance objects into one object group at a time t;
determining local features of the surveillance objects of the object group only, the determining of the local features in image areas of camera images that show a surveillance scene at a time t−1 chronologically before the fusion, wherein said local features comprise features ascertained by evaluating a partial area of the moving object areas, the image areas, or both the object areas and image areas comprising the objects fused into the object group, wherein said local features are features selected from the group consisting of textures, distribution of brightness, Kanade-Lucas-Tomasi (KLT) features, and Scale-Invariant-Feature-Transform (SIFT) features, or any combination thereof, wherein the determining the local features of the surveillance objects of the object group, found or determined at a time t−1, in a camera image at time t or t+1;
assigning the local features, found at time t and/or t+1, to a surveillance object of the object group; and
tracking and/or identifying the surveillance object in the object group on a basis of the assigned local features at time t and/or t+1.

10. A method as defined in claim 9; and further comprising erasing or deactivating the local features to determine at time t−1 and that cannot be determined at time t and/or t+1.

11. A method as defined in claim 10; and further comprising selectively assigning the local features that are determined at time t or t+1 and could not be determined at time t−1, as new local features to the surveillance objects of the object group.

12. A non-transitory computer readable medium storing a computer program with program code performing a method, when the stored program code is operated upon by a processing device or by an apparatus including a processing device with a memory for storing an image-based tracking of surveillance objects in front of a scene background in a surveillance scene, the method comprising:
detecting, by the processing device, a fusion of two or more surveillance objects into one object group at a time t;
determining local features of the surveillance objects of the object group only, the determining of the local features in image areas of camera images that show a surveillance scene at a time t−1 chronologically before the fusion, wherein said local features comprise features ascertained by evaluating a partial area of the moving object areas, the image areas, or both the object areas and image areas comprising the objects fused into the object group, wherein said local features are features selected from the group consisting of textures, distribution of brightness, Kanade-Lucas-Tomasi (KLT) features, and Scale-Invariant-Feature-Transform (SIFT) features, or any combination thereof, wherein the determining the local features of the surveillance objects of the object group, found or determined at a time t−1, in a camera image at time t or t+1;
assigning the local features, found at time t and/or t+1, to a surveillance object of the object group; and
tracking and/or identifying the surveillance object in the object group on a basis of the assigned local features at time t and/or t+1.

* * * * *